United States Patent
Ren et al.

(10) Patent No.: US 10,832,237 B2
(45) Date of Patent: Nov. 10, 2020

(54) METHOD AND SYSTEM FOR TOKEN-BASED COMMUNICATION BETWEEN EXTRANEOUS APPLICATIONS AND AN ELECTRONIC WALLET

(71) Applicant: DEUTSCHE TELEKOM AG, Bonn (DE)

(72) Inventors: Zhiyun Ren, Berlin (DE); Joerg Heuer, Berlin (DE); Klaus-Peter Hofman, Berlin (DE)

(73) Assignee: DEUTSCHE TELEKOM AG, Bonn (DE)

(*) Notice: Subject to any disclaimer, the term of this patent is extended or adjusted under 35 U.S.C. 154(b) by 725 days.

(21) Appl. No.: 14/652,801

(22) PCT Filed: Oct. 28, 2013

(86) PCT No.: PCT/EP2013/072510
§ 371 (c)(1),
(2) Date: Jun. 17, 2015

(87) PCT Pub. No.: WO2014/095136
PCT Pub. Date: Jun. 26, 2014

(65) Prior Publication Data
US 2015/0332255 A1    Nov. 19, 2015

(30) Foreign Application Priority Data
Dec. 19, 2012 (EP) .................................. 12198254

(51) Int. Cl.
*G06Q 20/36* (2012.01)
*G06Q 20/32* (2012.01)

(52) U.S. Cl.
CPC ......... *G06Q 20/367* (2013.01); *G06Q 20/322* (2013.01); *G06Q 20/3226* (2013.01); *G06Q 20/3278* (2013.01); *G06Q 20/36* (2013.01)

(58) Field of Classification Search
None
See application file for complete search history.

(56) References Cited

U.S. PATENT DOCUMENTS

| | | | |
|---|---|---|---|
| 2004/0024703 A1* | 2/2004 | Roskind | G06Q 20/02 705/40 |
| 2005/0177716 A1* | 8/2005 | Ginter | G06F 21/10 713/157 |

(Continued)

FOREIGN PATENT DOCUMENTS

EP    2500875 A1    9/2012

OTHER PUBLICATIONS

See Dialog Seach 2020.*

(Continued)

*Primary Examiner* — Dante Ravetti
(74) *Attorney, Agent, or Firm* — Leydig, Voit & Mayer, Ltd.

(57) ABSTRACT

A method for token-based communication between extraneous applications and an electronic wallet includes: (1a) selecting items for storage in the core wallet by one or more extraneous application(s); (1b) sending information on the selected items to the core wallet by the extraneous application(s); (1c) displaying the selected items on the terminal by the core wallet; (1d) waiting for activation of at least one of the displayed items based on interaction of the user with the core wallet; (1e) retrieving, for each activated item, a token associated with the item in the extraneous application from which the item originates by the core wallet; and (1f) storing the tokens retrieved in step (1e) in a wallet applet installed on a secure element that is configured for wireless radio communication.

13 Claims, 5 Drawing Sheets

(56) References Cited

U.S. PATENT DOCUMENTS

| | | | |
|---|---|---|---|
| 2009/0234751 A1 | 9/2009 | Chan et al. | |
| 2010/0276484 A1* | 11/2010 | Banerjee | G06Q 30/06 235/379 |
| 2012/0130839 A1 | 5/2012 | Koh et al. | |
| 2012/0310826 A1* | 12/2012 | Chatterjee | G06Q 20/322 705/41 |
| 2014/0108263 A1* | 4/2014 | Ortiz | G06Q 20/3223 705/71 |
| 2015/0348018 A1* | 12/2015 | Campos | G06Q 20/36 705/41 |

OTHER PUBLICATIONS

Ernst-Joachim Steffens, Axel Nennker, Zhiyun Ren, Ming Yin, Lutz Schneider: "The SIM-based mobile wallet", Proceedings of the 2009 13th International Conference on Intelligence in Next Generation Networks, Oct. 26, 2009 (Oct. 26, 2009), pp. 99-104, XP002698945.
Erika Chin et al: "Analyzing inter-application communication in Android", Mobisys '11, ACM, US, Jun. 28, 2011 (Jun. 28, 2011), pp. 239-252, XP058004575.

* cited by examiner

METHOD AND SYSTEM FOR TOKEN-BASED COMMUNICATION BETWEEN EXTRANEOUS APPLICATIONS AND AN ELECTRONIC WALLET

CROSS-REFERENCE TO RELATED APPLICATIONS

This application is a U.S. National Phase application under 35 U.S.C. § 371 of International Application No. PCT/EP2013/072510, filed on Oct. 28, 2013, and claims benefit to European Patent Application No. EP 12198254.0, filed on Dec. 19, 2012. The International Application was published in German on Jun. 26, 2014 as WO 2014/095136 under PCT Article 21(2).

FIELD

The present invention relates to a method and system for token-based communication between extraneous applications and an electronic wallet. In particular, the invention relates to a method and system for token-based communication between extraneous applications and an electronic wallet, wherein the extraneous applications are capable of simply communicating with an electronic wallet and utilising the functions of a safety element configured for wireless radio communication.

ABBREVIATIONS USED

NFC Near Field Communication
UICC Universal Integrated Circuit Card
SIM Subscriber Identity Module
APDU Application Protocol Data Unit
CRS Contactless Registry Service
PPSE Proximity Payment Systems Environment
POS Point of Sale
API Application Programming Interface

BACKGROUND

An electronic wallet (hereinafter also simply "wallet") is to be understood as a hard- and software module within a terminal, in most cases a mobile terminal such as a mobile cellular phone or smartphone consisting of two parts:
 a secure element (e.g. in form of a SIM card/UICC or a Java card integrated in the chip set of the terminal) with Java applets that can be addressed on the one hand by applications on the terminal and on the other hand via wireless radio communication (such as NFC) by points of acceptance (i.e. card readers) in the card emulation mode;
 software for representing, managing and enabling user interactions for Java card applications on the secure element.

With this architecture of an electronic wallet, real smart cards (for various fields of application, such as payment, customer cards, coupons) may be mapped on the terminal, wherein the Java applets on the secure element, e.g. the UICC, assume the role of the chip of the real card, whereas the wallet software on the terminal, such as the mobile cellular phone, assumes the role of the inscription (i.e. the imprint, design, logo and/or any further markings) on the physical card.

An "applet" means above and in the following an application that is configured for execution on a secure element.

Moreover, an application configured for execution with the operating system of the terminal will be termed "app" in the following.

The operating system of the terminal will hereinafter be termed "platform". A "mobile platform" is to be understood as the operating system of a mobile terminal.

Further, the term "object" is hereinafter to be understood as a data structure with operations on this data structure.

If the electronic wallet is on a mobile terminal, such as a mobile cellular phone, the electronic wallet will also be termed "mobile wallet".

Java applets on the secure element are usually represented in the user interface of the electronic wallet by graphical items, such as cards, allowing user interaction. Typical interactions are:
 activation for utilisation via the contactless interface,
 deactivation, if, for example for safety reasons, the use of a payment application should be excluded via the contactless interface.

These functions are typically provided by a component termed "core wallet" using standardised CRS and PPSE applets. The core wallet is a wallet component. Here, the applet CRS controls the applet activation on the secure element, whereas the PPSE applet specifically controls the activation and user preference of payment applets.

CRS stands for "Contactless Registry Service" and is specified in Global Platform Card Services Specification v2.2 Amendment C Contactless Services. It is an applet on the UICC listing all NFC applets and enabling manipulation of their status (active/inactive—see above). The PPSE (Proximity Payment System Environment) is a further applet defined in the EMV Entry Point Specification listing all payment applets on the UICC whose payment has been authorised by the user and an order of use preference. Both applets can only be executed by the wallet or core wallet.

On the one hand, this model typically requires an applet on the secure element for each card in the wallet, and, on the other hand, a service provider app has to be programmed that interacts with the applet on the secure element so as to provide a graphical user interface (cf. FIG. 1).

Note: In the following, the term "service provider app" is to be understood as those apps on the terminal that directly communicate with a corresponding service provider applet on the secure element.

The term "third party app" (in the following also referred to as "extraneous application"), however, is to be understood as all other apps on the terminal that do not have a communication interface to either the applets on the secure element or other remote ends via wireless radio communication, such as NFC.

The core wallet component lists all service provider apps available on a terminal and allows access thereto via a call interface. Alternatively, the user can avoid the wallet or core wallet and start the service provider apps by means of the app starter of the operating system installed on the terminal.

Prior art core wallets have the object of indicating the services in the wallet corresponding to an applet on the secure element and having a (possibly optional) user interface in form of a corresponding app. The core wallet moreover permits making the individual applets "visible" and "invisible" (activation and deactivation on the contactless interface) by means of wireless radio communication (such as NFC). The user may apply this function to activate, e.g., payment services in a supermarket queue and deactivate them upon payment. The core wallet may be preinstalled (possibly as part of the operating system) or subsequently loaded as an app.

SUMMARY

In an embodiment, the present invention provides a method for token-based communication between extraneous applications and an electronic wallet in a system comprising a terminal. One or more application programming interface(s) (API(s)) for listing, selecting and interacting with the secure elements are installed on the terminal. The terminal comprises a chip set for wireless radio communication. One or more secure element(s) are accommodated in the terminal and connected to the chip set for wireless radio communication. The electronic wallet comprises a core wallet. The method comprises: (1a) selecting items for storage in the core wallet by one or more extraneous application(s); (1b) sending information on the selected items to the core wallet by the extraneous application(s); (1c) displaying the selected items on the terminal by the core wallet; (1d) waiting for activation of at least one of the displayed items based on interaction of the user with the core wallet; (1e) retrieving, for each activated item, a token associated with the item in the extraneous application from which the item originates by the core wallet; and (1f) storing the tokens retrieved in step (1e) in a wallet applet installed on a secure element that is configured for wireless radio communication.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The model outlined in the background section involves at least the following disadvantages and problems:

For using a specific service, the user has to apply two applications: First, he/she must activate the applet pertaining to the service in the core wallet so as to render it accessible by wireless radio communication, such as NFC. Then, he/she has to change to the service-specific app (i.e. the service provider app), if any, so as to make configurations for the forthcoming use of the service.

Moreover, for some transactions, a plurality of services has to be used consecutively on the secure element. Here, the user has to repeat the above process several times.

Since core wallet and service provider apps are in most cases from different providers, their appearance and use concepts ("look & feel") are often quite different. In view of the aforementioned repeated processes, the user has to adapt to user interfaces of different appearance and operation.

Figure 1:
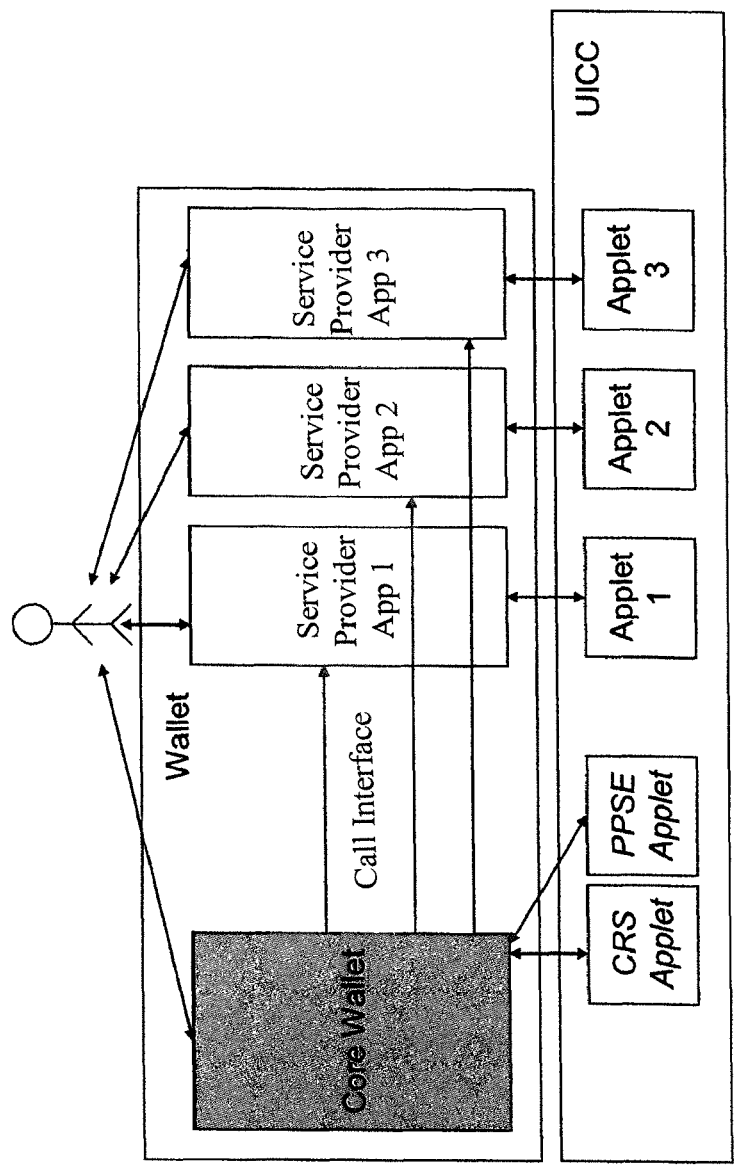
FIG. 1 shows: the wallet architecture with core wallet component and service provider apps.

In summary, the pure architecture shown in FIG. 1 leads to a quite bad user experience of the electronic wallet. The term "user experience" means in this case the sequence of user interactions with the terminal and the software installed thereon as well as the graphic software design.

Further disadvantages and problems of the prior art model outlined above are:

Each item that should be visible in the wallet or core wallet requires an applet on the secure element (such as the UICC) and a service provider app, if any. However, the memory capacity on the secure element is restricted and scarce and, moreover, the implementation of the service provider app is laborious to the service provider.

Furthermore, the installation of such an applet/app combination is more complicated than simply loading an app in an app store.

For service providers, it is generally more advantageous and simpler to program a simple app, which, however, would not profit by the advantages of wireless radio communication (such as an NFC connection) of the secure element. In particular, many service providers already have apps they would like to continue using.

In an embodiment, the present invention provides a method and system for token-based communication between extraneous applications and an electronic wallet that avoids or does not involve the above disadvantages and problems.

One aspect of the invention relates to a method for token-based communication between extraneous applications and an electronic wallet in a system. The system comprises a terminal, wherein: the terminal is configured to accommodate one or more secure element(s); one or more application programming interface(s) (APIs) for listing, selecting and interacting with the secure elements are installed on the terminal; and the terminal comprises a chip set for wireless radio communication. The system further comprises one or more secure element(s) that are accommodated in the terminal and connected to the chip set for wireless radio communication. Moreover, the electronic wallet comprises a core wallet. The method comprises the following steps:

(a) selection of items for storing in the core wallet by one or more extraneous application(s);

(b) sending of information on the selected items to the core wallet by the extraneous application(s);

(c) display of the selected items on the terminal by the core wallet;

(d) waiting for the activation of at least one of the displayed items by interaction of the user with the core wallet;

(e) retrieval of a token associated with the item in the extraneous application from which the item originates by the core wallet for each activated item;

(f) storing of the tokens retrieved in step (e) in a wallet applet installed on a secure element that is configured for wireless radio communication.

In a preferred embodiment of the above method, the terminal is suitable for mobile radio communication; the terminal can, for example, be a mobile radio unit or a smart phone and/or suitable for WLAN communication. The terminal may, for example, also be a laptop/notebook or a tablet computer.

In an embodiment, the method further comprises the following further step:

reading out of the tokens stored in the wallet applet according to step (f) by an acceptance unit suitable for wireless radio communication with the secure element, such as a cash point configured for wireless radio communication.

In an embodiment, step (a) of selecting items comprises the following steps:
waiting of the extraneous application(s) for a user interaction;
selection of the items on the basis of the information transmitted to the extraneous application(s) by the user interaction.

Here, the user interaction is preferably a marking of items. Moreover, during the selection of items by the extraneous application(s), exactly the items marked by the user are preferably selected.

In an embodiment of the method, the selection of items according to step (a) by the extraneous application(s) is automatically made according to predetermined filter criteria.

In one embodiment of the method, the sending of information on the selected items from the extraneous application(s) to the wallet according to step (b) is realised by an interface implemented in the core wallet for transmitting information.

Preferably this information comprises descriptive text and/or one or more graphical elements for displaying the items in the wallet.

In an embodiment of the method, the display of the selected items on a terminal according to step (c) comprises the display of text or graphical elements on the terminal display.

In an embodiment of the method, the display of the selected items on a terminal according to step (c) comprises the playback of acoustic signals or speech outputs.

In an embodiment of the method, the retrieval of the token in the extraneous application(s) by the core wallet according to step (e) is made via an interface implemented in the extraneous application for retrieving a token.

In an embodiment of the method, wireless radio communication is realised by radio-based near field communication (NFC).

In an embodiment of the method, the secure element is a Universal Integrated Circuit Card (UICC) or a SIM card.

One aspect of the invention relates to a system for token-based communication between extraneous applications and an electronic wallet. The system comprises a terminal, wherein the terminal is configured to take up one or more secure elements; one or more application programming interface(s) (APIs) for listing, selecting and interacting with the secure elements are installed on the terminal; and the terminal comprises a chip set for wireless radio communication. The system moreover comprises one or more secure element(s) connected to the chip set for wireless radio communication and accommodated in the terminal. A core wallet is installed on the terminal, wherein the core wallet is configured for receiving information sent by (an) extraneous application(s) and retrieving tokens in (an) extraneous application(s). Moreover, the terminal is configured for displaying items in the core wallet and activating the items in the core wallet by user interaction. Moreover, a wallet applet is installed on each of the one or more secure element(s), wherein each of the wallet applets is configured for receiving and storing tokens from the core wallet.

In a preferred embodiment of the above system, the terminal is suitable for mobile radio communication; the terminal may, for example, be a mobile radio unit or a smart phone and/or may be suitable for WLAN communication. The terminal may, for example, be a laptop/notebook or a tablet computer.

In an embodiment of the system, each of the wallet applets is configured for reading out the tokens stored in the respective wallet applet by an acceptance unit that is suitable for radio communication with the secure element on which the respective wallet applet is installed, such as a cash point configured for wireless radio communication.

In an embodiment of the system, the core wallet comprises an interface for transmitting information from the extraneous applications to the core wallet.

In an embodiment of the system, each of the extraneous applications comprises an interface for retrieving tokens via the core wallet.

In an embodiment of the system, the wireless radio communication is realised by radio-based near field communication (NFC).

In an embodiment of the system, each of the secure elements is a Universal Integrated Circuit Card (UICC) or a SIM card.

The present invention shows a way for users to utilise the services of separately installed third-party apps (extraneous applications) without leaving the uniform core wallet environment. The present invention moreover shows a way for service providers to utilise the advantages of the wallet or core wallet by using interfaces to the wallet or core wallet, while avoiding, however, the aforementioned disadvantages. In particular, the invention, which will be described in the following in detail, involves the following advantages:

Users need not leave the wallet so as to activate, configure or utilise service provider apps or extraneous applications.

Service providers need not arrange for space on the secure element (such as the UICC) themselves so as to make their items visible at the respective acceptance units via wireless radio communication (such as NFC).

Service providers need not program, or provide for and configure applets.

Service providers can continue to use their existing apps: to this end, they simply have to expand them by interfaces to the wallet.

The concentration of items in the wallet or core wallet and the link-up of service provider apps and extraneous applications with the wallet via interfaces allows for a quite narrow integration of different services concentrated in the wallet. For example, three item classes may jointly be treated during the payment at a cash point without the need of a retrieval of the service provider apps visible to the user: payment, redemption of coupons, use of bonus cards.

For very specific functions, it is still possible to start the service provider app so that there are no functional restrictions whatsoever as compared with the original architecture.

The invention will be described in the following by means of examples and the drawings.

Requirements:
1) The user owns a mobile cellular phone or any other terminal capable of taking up one or more secure elements.
2) There are APIs on the terminal for listing, selecting and addressing APDU commands.
3) For wireless radio communication, the terminal has to have a correspondingly configured chip set, such as an NFC chip set.

4) The platform allows separately installed apps to be linked by corresponding platform-specific mechanisms.

Description of the method:

The method according to the present invention is based on providing APIs between any service provider apps or extraneous applications and the wallet or core wallet on the terminal so as to enable the use of the service provider apps without these apps having to be directly called up.

Figure 2:
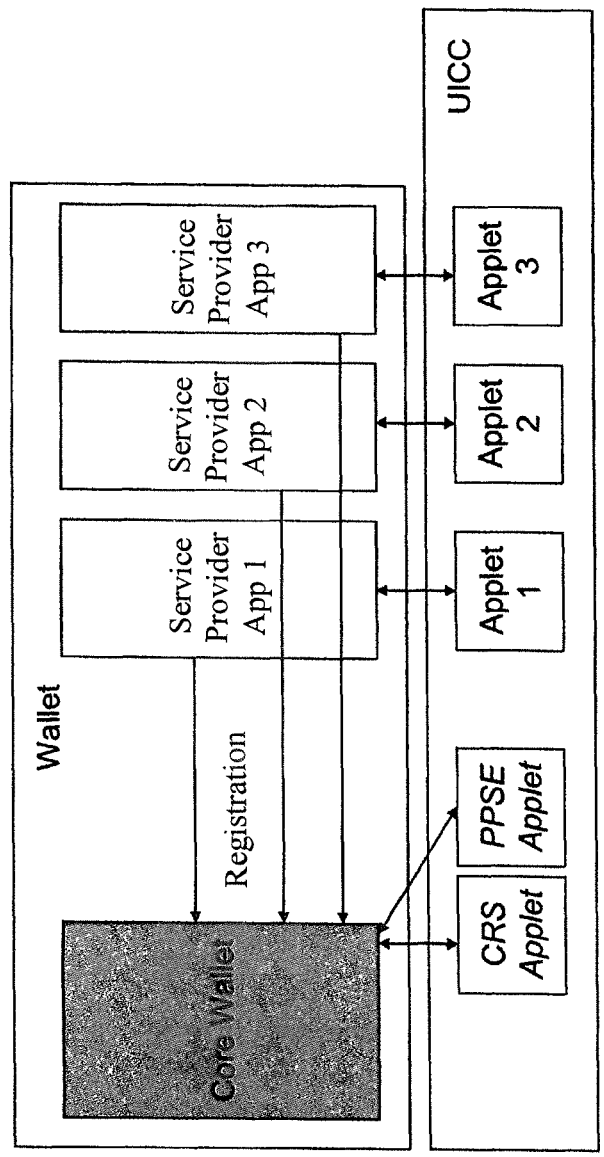
FIG. 2 shows: the registration of the service provider apps in the wallet.

The life cycle of a service provider app in the wallet essentially consists of two phases:

1) Registration phase: The service provider app registers at the core wallet where it transfers the metadata, such as name, brief description and logos. Moreover, the service provider app registers the available functions and transaction parameters. Functions are here the operations the core wallet can execute without any direct reference to a transaction by means of wireless radio communication (e.g., setting a general limit for the amount of NFC-based payments), whereas transaction parameters are configurations for an imminent transaction (such as, e.g., "activation of the NFC payment function for the next transaction"). This is schematically shown in FIG. 2.

Figure 3:
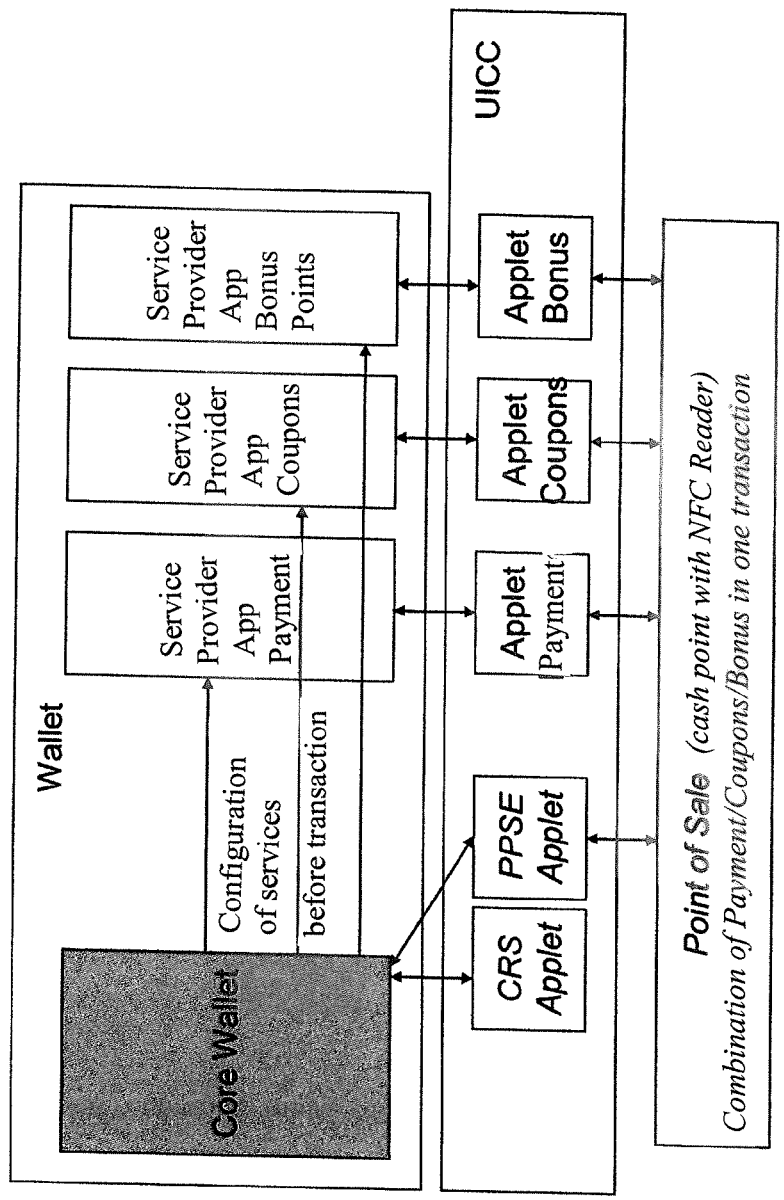
FIG. 3 shows: the transaction at the point of sale with three services being involved.

2) Use phase: In this phase, the user on the hand calls up functions of the service provider apps directly in the wallet. On the other hand, he/she can conveniently prepare transactions (e.g., combination of payment/redemption of coupons/collection of bonus points) in the core wallet without having to directly operate the service provider apps involved (see FIG. 3).

Due to the architecture, there is a virtual item flow: Items from the service provider app or extraneous application first reach the wallet or core wallet, then the wallet applet and eventually the acceptance unit (such as a POS terminal), where they are processed (see FIG. 4).

There are, for example, APIs between arbitrary extraneous applications (third-party apps) and the wallet or core wallet on the terminal (in specific cases, these can of course again be service provider apps with UICC/applet connection) for storing items in the wallet or core wallet. There, these items (such as coupons from a coupon extraneous application) are visible on the same level as cards of service provider apps and may be selected by the user, e.g., for use via wireless radio communication (such as NFC).

So as to render these items (such as coupons) usable via wireless radio communication, such as NFC, a further component has to be installed on the secure element (e.g., the UICC): the so-called wallet applet. In this applet, the items selected by the user are stored by the wallet or core wallet so that they can be read out by an acceptance unit.

In case of a coupon extraneous application (coupon third-party app), the process could be as follows (cf. FIG. 4):

1. The user defines in the extraneous application which coupons should be visible in the wallet or core wallet. On the one hand, this can be achieved by explicit selection, on the other hand, by the definition of filter criteria with which the extraneous application automatically selects coupons.
2. If the user wants to initiate a payment using coupons, he/she starts the wallet or core wallet.
3. The extraneous applications provide the wallet or core wallet with information on the selected coupons via the so-called "content provider interface" (Prov IF). To this end, a descriptive text and graphical elements for display in the wallet or core wallet are also transmitted.
4. The user now has the possibility of activating the items transmitted by the extraneous applications for use via wireless radio communication (such as NFC).
5. For each activated item, the wallet or core wallet uses the getToken( ) interface to retrieve a custom-designed token from the extraneous application and store it in the wallet applet for using wireless radio communication (such as NFC use).
6. Upon being contacted, an acceptance unit (such as, e.g., a supermarket checkout) contacts the wallet applet to read out the tokens for use during the payment process. Before that and afterwards, the acceptance unit may also interact with other applets on the secure element (such as the UICC), e.g., to carry out the payment transaction.

Figure 4:
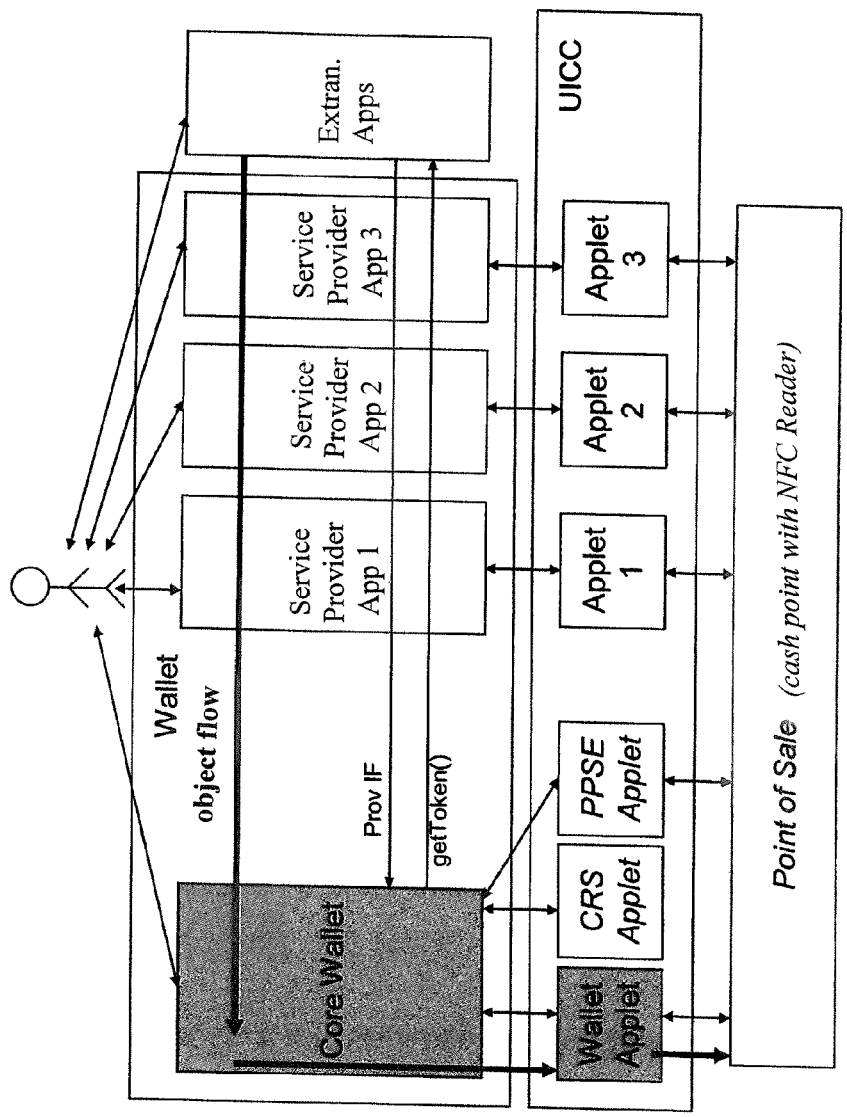
FIG. 4 shows: the virtual item flow from service provider/third-party apps to the POS.

As a result, there is an item flow from the extraneous application to the wallet or core wallet, to the wallet applet on the secure element (e.g., the UICC) and from there further to the acceptance unit (again see FIG. 4).

The wallet or core wallet API is, for example, as follows (in Java-based pseudo code):

StatusCode login(appType, appId, appDisplayName)
Achieves a loose coupling between service provider app or extraneous application and wallet or core wallet. The type (such as 0=coupon, 1=loyalty card), numeric appId as well as appDisplayName are transmitted to the wallet or core wallet as a string. During login, the wallet or core wallet checks, if applicable, the rights of the calling app to login with the transmitted data.

The API of the service provider app or extraneous application called by the wallet or core wallet, is for example as follows:

StatusCode register( )
The wallet or core wallet broadcasts register( ) to all apps in the system. Service provider apps or extraneous applications that are waiting for this call then carry out a login( ) to the wallet or core wallet to signal their readiness to communicate with the wallet or core wallet.

List of <CardId> getCards(SelectionFlag)
Returns all cards (if SelectionFlag is false) or all card selected by the user (if SelectionFlag is true) to the wallet or core wallet.

CardDisplayToken getCardDisplayToken(CardId)
Provides a data structure for the graphic representation of a card within the wallet or core wallet.

Token getToken(CardId)
Provides a token for a card indicated by CardId. The wallet or core wallet will make this token available via wireless radio communication, such as NFC. The token content is not important for the wallet or core wallet; only the service provider app and the acceptance unit (POS) has to be capable of interpreting it.

StatusCode notifyCardUsage(CardId)
By this call, the wallet or core wallet informs the service provider app of the successful use of a card.

Figure 5:
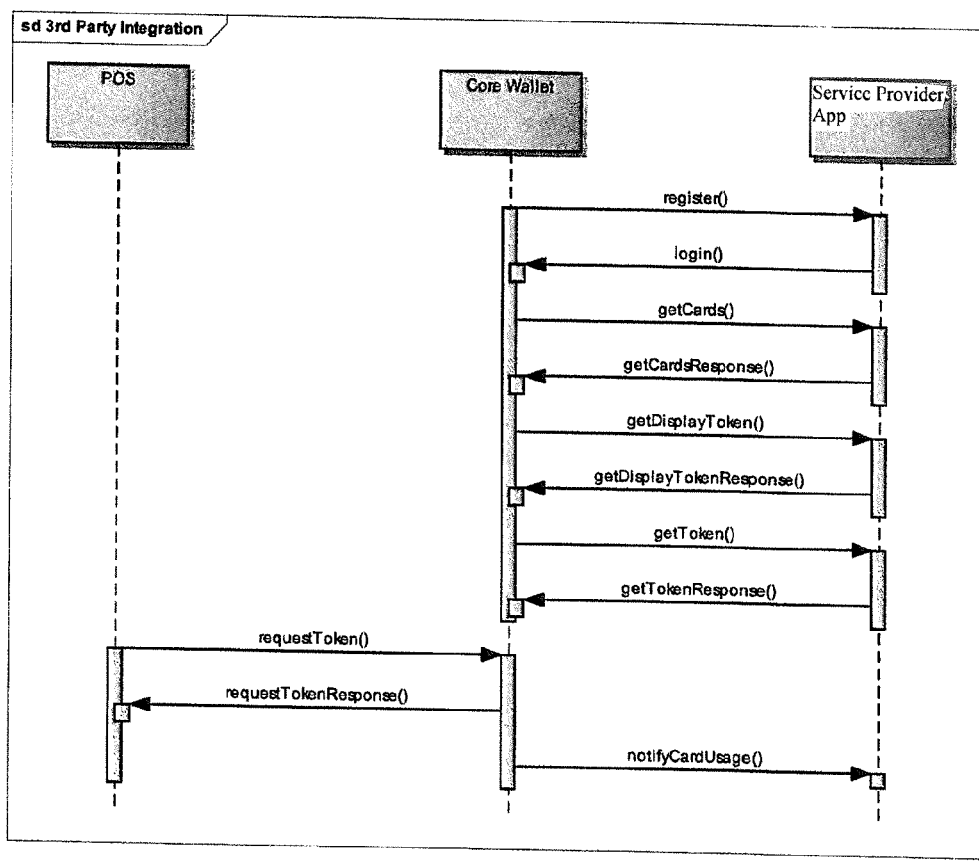
FIG. 5 shows: a sequence diagram of the API retrievals.

An exemplary call sequence of the aforementioned APIs is shown in FIG. 5.

Although the invention is illustrated and described in detail by the drawings and the corresponding description, this depiction and detailed description are meant to be only illustrative and exemplary and do not restrict the invention. Of course, skilled persons can make changes and modifications without leaving the scope of the following claims. In particular, the invention also encompasses embodiments comprising any combination of features mentioned or illustrated above in connection with different aspects and/or embodiments.

The invention also encompasses individual features of the drawings, even if they are shown therein in connection with other features and/or are not mentioned above.

Moreover, the term "comprise" and derivations thereof does not exclude other elements or steps. Moreover, the indefinite article "a(n)" and derivations thereof do not exclude a plurality. The functions of several features mentioned in the claims may be performed by a unit. The terms "substantially", "about", "approximately" and the like in connection with a property or value in particular also define this very property or value. Any reference numerals in the claims are to be understood as not restricting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for allowing a user to utilize services of third party apps of a terminal using a core wallet, the method comprising:
   selecting, via one or more third party apps of the terminal, one or more items relating to a transaction;
   sending, by the one or more third party apps of the terminal, information regarding the one or more selected items to a core wallet of the terminal;
   displaying, by the core wallet of the terminal, the information regarding the one or more selected items on the terminal;
   receiving, by the terminal, user input corresponding to one or more of the one or more selected items for the transaction;
   retrieving, by the core wallet, for each respective item corresponding to the received user input, a token associated with the respective item from a respective third party app corresponding to the respective item;
   storing, by the core wallet, each retrieved token in a wallet applet of a secure element of the terminal; and
   outputting, by the wallet applet, each stored token via a wireless radio communication component of the terminal as part of the transaction.

2. The method of claim 1, wherein the terminal is connected to a mobile radio communication network and/or is connected to a wireless local area network (WLAN).

3. The method of claim 1, wherein each stored token is output to an acceptance unit via wireless radio communication.

4. The method of claim 1, wherein the one or more selected items are selected based on user input received by the one or more third party apps.

5. The method of claim 1, wherein the one or more selected items are selected by the one or more third party apps according to predetermined filter criteria.

6. The method of claim 1, wherein displaying the information regarding the one or more selected items on the terminal further comprises:
   displaying text or graphical elements on a display of the terminal; and/or
   playing back acoustical signals or speech outputs.

7. The method of claim 1, wherein the wireless radio communication component is a near field communication (NFC) communication component.

8. The method of claim 1, wherein the secure element is a Universal Integrated Circuit Card (UICC) or a Subscriber Identity Module (SIM) card.

9. A terminal, comprising a processor and a non-transitory computer-readable medium having processor-executable instructions stored thereon, wherein the processor is configured to execute the processor-executable instructions to carry out a method comprising:
   selecting, via one or more third party apps of the terminal, one or more items relating to a transaction;
   sending, by the one or more third party apps of the terminal, information regarding the one or more selected items to a core wallet of the terminal;
   displaying, by the core wallet of the terminal, the information regarding the one or more selected items on the terminal;
   receiving, by the terminal, user input corresponding to one or more of the one or more selected items for the transaction;
   retrieving, by the core wallet, for each respective item corresponding to the received user input, a token associated with the respective item from a respective third party app corresponding to the respective item;
   storing, by the core wallet, each retrieved token in a wallet applet of a secure element of the terminal; and
   outputting, by the wallet applet, each stored token via a wireless radio communication component of the terminal as part of the transaction.

10. The terminal of claim 9, wherein the terminal is connected to a mobile radio communication and/or a wireless local area network (WLAN).

11. The terminal of claim 9, wherein outputting each stored token comprises outputting each stored token to an acceptance unit via wireless radio communication.

12. The terminal of claim 9, wherein the wireless radio communication is radio-based near field communication (NFC).

13. The terminal of claim 9, wherein the secure element is a Universal Integrated Circuit Card (UICC) or a Subscriber Identity Module (SIM) card.

* * * * *